Figure 1:
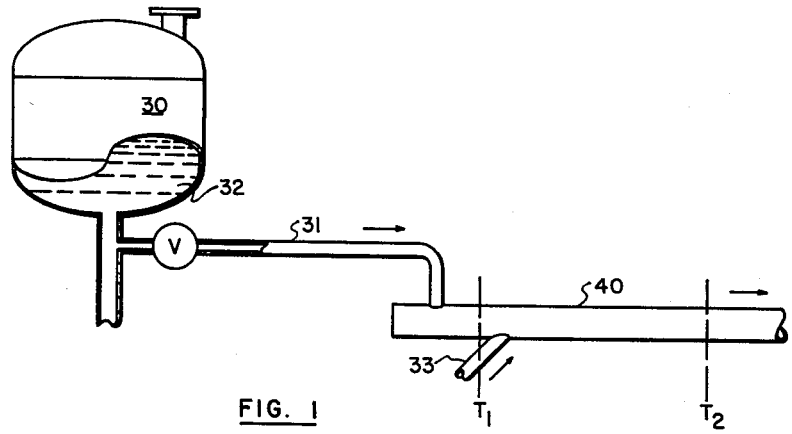

March 9, 1965 C. I. GLASSBROOK ETAL 3,172,730
METHOD AND APPARATUS FOR THE DETERMINATION
OF UNSATURATED HYDROCARBONS
Filed Aug. 31, 1960

United States Patent Office 3,172,730
Patented Mar. 9, 1965

3,172,730
METHOD AND APPARATUS FOR THE DETERMINATION OF UNSATURATED HYDROCARBONS
Clarence I. Glassbrook and Merlin M. Koenecke, Baton Rouge, La., assignors to Ethyl Corporation, New York, N.Y., a corporation of Virginia
Filed Aug. 31, 1960, Ser. No. 53,261
8 Claims. (Cl. 23—230)

This invention relates to method and apparatus for quantitatively determining the presence of a chemical compound, or compounds, in admixture with other chemical compounds. In particular, the invention relates to method and apparatus for quantitatively and continuously determining the amount of chemical unsaturation of a process stream, or an unsaturated hydrocarbon compound, particularly ethylene, within a process stream.

Often in chemical plant practice for reasons of necessity or convenience the quantity of a material, or materials, in admixture with other materials within a process mixture, or within a process stream, must be monitored. Thus, in many processes it is necessary to determine the quantity, or relative quantity, of chemical compounds contained within process streams. One such process, for example, is one wherein ethylene is reacted with hydrogen chloride in liquid phase and in the presence of a catalyst to produce ethyl chloride. It is necessary in such a process to accurately monitor the off-gases for the presence of ethylene at frequent intervals, and preferably continuously, to determine the quantity of unreacted ethylene therein. This monitoring step is necessary to prevent excess consumption of catalyst and waste of ethylene by overfeeding ethylene to the process. The present methods for the determinations of ethylene in the off-gas involve complex infrared analysis techniques, and even more generally the intermittent taking of samples and analytic determinations by adsorption-gravimetric techniques. These methods of analysis are not entirely satisfactory and are expensive.

Accordingly it is an object of the present invention to provide method and apparatus for quantitatively determining the presence of a chemical compound admixed with other chemical compounds. It is also an object of the invention to provide method and apparatus for determination of the chemical unsaturation of a process stream. In particular, it is an object to provide a new method for directly, continuously and quantitatively monitoring a process stream to determine the amount of unsaturated compounds contained therein, said method being utilizable by the use of simple and inexpensive apparatus not requiring complex electrical circuitry. It is especially an object of the present invention to provide method and apparatus for the quantitative estimation of an olefin, especially ethylene, in a process stream. It is also an object to provide a primary sensing device useful with control means for regulating the unsaturation in a process stream.

Figure 2:
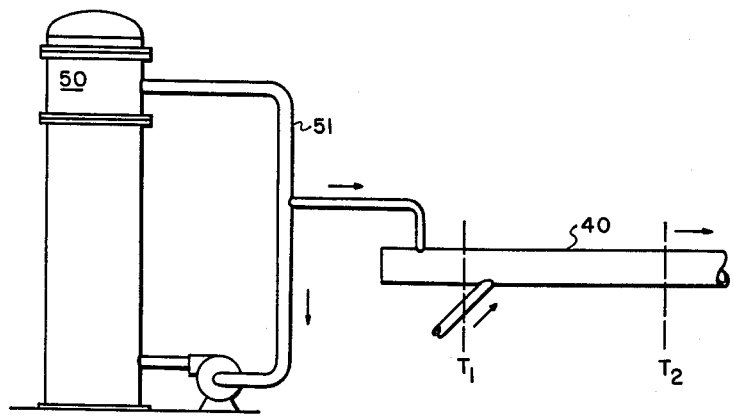
Figure 3:
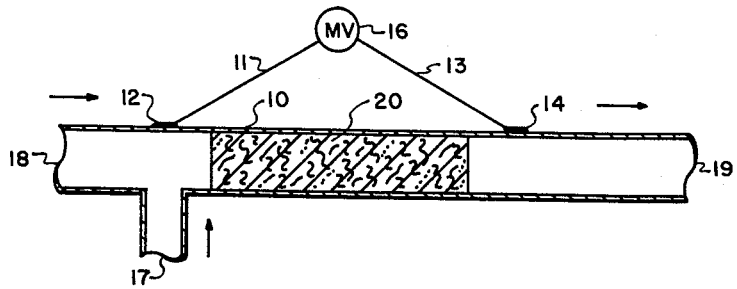

The invention will be better understood by referring to the accompanying figures wherein FIGURE 1 shows the withdrawal and measurement of a portion of the contents of a reactor;

FIGURE 2 shows the withdrawal and analysis of a portion of a process stream; and FIGURE 3 is a preferred apparatus.

The method of this invention comprises withdrawing a portion of a mixture to be analyzed and passing it through a measurement zone. Within the zone the portion is mixed with a reagent characterized in that it is capable of selectively chemically reacting, in known stoichiometric proportions, with the chemical compound, the presence and quantity of which is to be determined. By measuring the temperature of the mixture at a first fixed point in the zone prior to any substantial degree of mixing or chemical reaction, then measuring the temperature at a second fixed point downstream of the first point to obtain a temperature differential and comparing this differential with a calibration measurement obtained in the same manner on the same type of mixtures containing differing but known concentrations of the chemical compound to be measured a quantitative estimate of the last named chemical compound in admixture with other chemical compounds can be determined. In short, the differential temperature of a stream containing an unknown quantity of a chemical compound in admixture with other chemical compounds is translatable into a reading proportional to the amount of the unknown compound contained within the stream. In other words, the chemical reaction, which begins at or near the entry portion of the zone, produces or absorbs heat. By measuring the temperature differential between the two fixed points within the zone the quantity, or relative quantity, of the compound within the portion can be determined. For example, where unsaturated and saturated hydrocarbon chemical compounds are both present in a process stream, and a sufficient amount of a reagent is added to react with all of the unsaturates but which is incapable of reacting with the saturated hydrocarbons under the conditions provided, then the differential temperature is directly proportional to the chemical unsaturation of the product stream and where calibration curves have been determined by plotting the differential temperatures obtained by chemically reacting a reagent with mixed portions of known compositions, the differential temperature gives a precise determination of the quantity of the unsaturated compound within the process stream. To illustrate, suppose that a chemical process stream is composed of composition A and B and it is desired to determine the amount of A within the stream. A reagent C is selected which will react with A but not with B. Runs are then made wherein C is contacted with known compositions of A and B. In so doing C reacts with A to produce an endothermic or an exothermic reaction. The differential temperatures are measured and plotted. This having been done the differential temperature obtained when C is reacted with an unknown composition of A and B is a measure of the quantity of A contained within the stream. The differential temperatures can even be interpreted on some visual indicating means to read directly in percent of A in the stream.

To determine chemical unsaturation pursuant to the method of the present invention all that is necessary is that the process stream containing the unsatured compound, or compounds, be mixed with a reagent or a material chemically reactive therewith but unreactive with the non-unsaturated compound, or compounds, so as to provide a measurable temperature differential between the initial temperature of the process stream or just prior to any substantial degree of chemical reaction and a second location downstream of the initial point of mixing. The sensitivity of the method is directly proportional to the device employed to determine the differential temperature.

In one particularly preferred embodiment of the method the presence and amount of an olefin hydrocarbon, such as ethylene, can be determined within a process stream at ambient conditions by reacting the ethylene with a halogen, as for example chlorine. The reaction between an ethylene containing stream and chlorine is conducted in the presence of hydrogen chloride. For best results it is also extremely desirable that the reaction within the zone be conducted by intimate mixing of the chlorine and the process stream containing ethylene. In this instance, quite surprisingly, to produce reaction between ethylene and chlorine at ambient conditions it is essential that the hydrogen chloride be present. The reason for this requirement is not understood though it is believed that hydrogen chloride must be present at ambient conditions to initiate free radical formation which produces the chlorination reaction. In any event however this particularly preferred embodiment provides an extremely simple, accurate and cheap method for determining the quantitative amount of ethylene in a process or in a process stream. This method is also applicable to the quantitative determination of either hydrogen chloride or chlorine where these compounds are present in a process stream. Ethylene in this instance is employed as the chemically reactive compound to quantitatively detect the presence of either one of these compounds and in the presence of the other.

Any chemical compound capable of chemically reacting with another compound to produce a measurable temperature change can be detected pursuant to this invention. The method is particularly effective for the detection and quantitative estimation of gaseous and liquid unsaturated hydrocarbon compounds and particularly those containing from 2 to about 12 carbon atoms whether or not the chemical unsaturation be as double or triple bonds, or both, e.g., whether or not the unsaturated compounds be alkenyl or alkynyl or whether or not other substituents be contained within the molecule. The method however is especially suitable for the detection of normally gaseous olefin hydrocarbons and with extreme accuracy and sensitivity.

Particularly suitable compounds reactive with the unsaturated hydrocarbon compounds are mineral acids such as sulfuric acid, hydrochloric acid and the like; and halogens such as bromine, chlorine, fluorine, and the like. These compounds liberate sufficient heat so as to provide accurate and easy determination with very simple measuring devices. Chlorine in particular is highly desirable for these and other reasons, and particularly because it reacts with unsaturates quickly and is not highly corrosive.

The following description further illustrates the invention.

FIGURE 1 shows a typical setup for the detection and quantitative estimation of a chemical compound admixed with other compounds within a reactor 30. By means of the line 31 a portion of the liquid contents of the reactor 30 can be drawn off into the measuring zone 40. By passing into the zone 40 through line 33 a sufficient quantity of a reagent reactive only with the constituent of the reactor contents 32 to be measured, the quantity of the constituent compound in the reactor contents can be determined. A liberation or absorption of heat is thus produced by the reaction. The differential temperature, $T_2-T_1$ is a measure of the reacting compound within the reactor contents 32.

FIGURE 2 shows a similar device for continuously measuring the recycle stream within the line 51 of the reactor 50.

An apparatus embodiment of the present invention comprises an open end metal tubular portion upon an outer surface of each end of which is affixed, in direct and intimate electrical contact therewith, leads composed of a metal dissimilar to that of which the tubular portion is composed. The locations at which the two leads contact the tubular metal portion thus provide junctions or contacts for measuring any temperature differential between those locations. The opposite ends of each of the leads are operatively engaged to an indicating device such as a millivoltmeter for converting differential temperature into electrical energy which electrical energy is converted into a visual or otherwise intelligible signal. Preferably, because of its cheap mode of construction and its simplicity and because of its great effectiveness, the device is an iron or ferrous metal tube upon the outer surface of each end of which is affixed a constantan wire or other non-ferrous lead, each lead being operatively connected to an indicating device.

A preferred apparatus embodiment is shown in FIGURE 3. The metal tubular portion is thus composed of a segment of an open end iron pipe 10 provided with openings 17, 18, 19. The iron pipe 10 is also packed with iron or steel wool 20. Upon the outer surface of each end of the pipe 10 is affixed the end of a constantan wire lead 11, 13. The solder 12, 14 provides intimate electrical contact between the outer surface of the pipe 10 and the leads 11, 13. The other ends of the leads 11, 13 are operatively connected to a millivoltmeter 16.

The following non-limiting examples demonstrate preferred embodiments of the invention and the best modes of operation in accordance therewith. The apparatus embodiment described is that shown by reference to FIGURE 3.

*Example I*

A process stream of the following approximate weight composition was analyzed for the presence of ethylene:

|   | Percent |
|---|---|
| Ethylene | 0.1 |
| Ethane | 0.9 |
| Nitrogen | 29 |
| Hydrogen chloride | 70 |

The feed stream at a temperature of 30° C. was fed continuously into the opening 18 of the iron pipe 10 at a linear velocity at approximately 6.75 feet per minute. Chlorine gas at a temperature of approximately 30° C. and sufficient to react with all of the ethylene in the stream, was fed into the opening 17 at a linear velocity of approximately 0.068 foot per minute. The streams were intimately mixed within the entry of the pipe 10, the mixed gases exiting through opening 19. A differential between the entry portion and the exit portion of 0.1 millivolt was recorded. This reading, having already been calibrated on mixtures containing differing known quantities of ethylene, showed the correct amount of ethylene within the process stream. The degree of accuracy was almost 100 percent.

*Example II*

When the ethylene within the process stream increased 20-fold and the other components of the stream decreased in proportion and the above process repeated, with sufficient chlorine for complete reaction, the percent ethylene in the process stream was again determined with extreme accuracy.

*Example III*

Example I is repeated with a process stream having 5 weight percent ethylene, and the other components of the stream reduced proportionately. Sufficient chlorine is added to completely react with ethylene in the stream. The temperature differential, measured with two mercury-in-glass thermometers, is found to be 100° C. This corresponds to 5.3 percent ethylene in the stream, indicating an accuracy of 94.5 percent.

*Example IV*

A stream at ambient temperature containing 5 mole percent styrene and 95 mole percent benzene is fed through a Pyrex glass tubing. At the entry portion of the tubing a sufficient quantity (1 percent excess) of 90 weight percent sulfuric acid at ambient temperature is added thereto a react with the styrene. Two mercury-in-glass thermometers, at the entrance and exit portions of the tube, show a differential temperature of 80° C. which corresponds almost identically to the reading one would expect for the percent styrene known to be present in the stream.

*Example V*

When Examples I through III are repeated except the unsaturated compounds present within each of the process streams are acetylene, vinyl chloride, propylene, 1,3- butadiene and p-butoxy styrene, respectively, equally good results are obtained.

It is at once apparent that the invention is capable of considerable variation without departing from the spirit and scope of the invention. The detection of the chemical compounds is dependent upon a known amount of heat which will be generated or absorbed by chemical reaction with another compound. The sensitivity or accuracy of the method is contingent upon the device employed to measure the differential temperature. Thus, for normal temperature measurements it is preferable to employ a differential thermocouple or even a pair of thermometers. For extreme accuracy a pair of thermistors can be employed, this device being capable of measuring the temperature differential of within 0.01° C. or even less. Unsaturated hydrocarbon compounds of an extremely wide variety can be detected within process streams pursuant to this invention. It is only necessary to select a compound chemically reactable therewith (but non-reactive with other compounds within the stream) so as to produce a liberation or absorption of heat. Conditions are produced within the reaction zone to provide the necessary reaction conditions.

As stated, any of a very wide variety of unsaturated hydrocarbon compounds are capable of detection within process streams. The unsaturated hydrocarbon compounds can be gases, liquids, or even solids if suspended or dissolved in solution, and can be of any conceivable molecular weight, the only requisite being that they are capable of reaction with another material to produce heat. The method has been found to work most efficiently with unsaturated hydrocarbon compounds containing from 2 to about 12 carbon atoms. The unsaturated hydrocarbon compounds can be alkenes and alkynes, whether substituted or unsubstituted. Examples of suitable alkenes include ethylene, propylene, 1,4-butadiene, hexene-1, 2-chloro-1-heptene, styrene, 3-phenyl-1-hexene, and the like. Examples of suitable alkynes include acetylene, propyne-1, phenyl acetylene, 3-chloro-1-propyne, 3-phenyl-1-propyne and 3-benzyl-1-butyne. As stated also, a variety of compounds can be used for reaction with the unsaturated hydrocarbon compounds. Non-limiting examples of such compounds are mineral acids such as phosphoric acid, sulfuric acid, hydrochloric acid, and the like. Halogen gases and mixtures thereof are also suitable for reaction with the unsaturated olefins as for example, bromine, chlorine, fluorine and the like. Oxygen or oxygen-containing streams are also suitable for reaction with the unsaturated hydrocarbon compounds.

Various apparatus embodiments of the invention are also possible. Any temperature measuring device can be employed for measuring the temperature differential. Where a differential thermocouple is employed for measuring the heats of reaction it is often preferable that the reaction tube be composed of one metal and that the electrical leads in contact therewith be composed of a dissimilar metal which will permit the hot and cold junctions created during the reaction to produce an electric current which can be measured by any device capable of registering an electric flow in quantitative terms.

While this invention has been described largely in connection with the measurement or determination of unsaturated hydrocarbons contained within a process stream it is nevertheless quite obvious that the method can be employed with any mixture of chemical compounds wherein a reagent can be employed which will selectively react with a particular compound, or compounds without reacting with other compounds within the stream. In addition to the necessity of employing a selective reagent it is only necessary that the reaction proceed exothermically or endothermically to produce a measurable temperature change, and within a reasonably short time so that the temperature change can be measured without excessive radiation losses. Illustrative of compounds whose presence can be quantitatively detected when present in admixture with other compounds are the quantitative determination of an aromatic compound, such as benzene or toluene, in admixture with a saturated liquid hydrocarbon, such as hexane or heptane, by use of a reagent consisting of a mixture of concentrated sulfuric acid and dry phosphous pentoxide; detection of a compound containing an active hydrogen, e.g., water, acids, alcohols, ammonia or amines in admixture with saturated hydrocarbons, such as octane, or in admixture with aromatic hydrocarbons, such as benzene, by use of a Grignard reagent; detection of a polyhydroxy alcohol, such as glycerol, in a mixed stream of saturated and aromatic hydrocarbons, such as heptane, octane, benzene, toluene and xylene, by nitration with concentrated nitric acid at room temperature; and the like.

Having described the invention, what is claimed is:

1. A method for qualitatively determining the presence of an unsaturated hydrocarbon compound contained within a mixture of chemical compounds inert to chlorine under reacting conditions, comprising withdrawing a portion of said mixture and passing it through a measurement zone into which hydrogen chloride is concurrently added, mixing chlorine with said portion in the zone, said chlorine being mixed therewith in at least stoichiometric quantities with the unsaturated hydrocarbon compound contained within the mixture, measuring the temperature of the merging portion and reagent at a fixed point in the zone just prior to any substantial degree of chemical reaction, then measuring the temperature at a second fixed point downstream of the first point.

2. A method for qualitatively determining the presence of ethylene within a mixture of chemical compounds comprising withdrawn a portion of said mixture and passing it through a measurement zone, mixing in the zone into which hydrogen chloride is concurrently added chlorine with said portion in at least stoichiometric proportions with the ethylene contained within the mixture, measuring the tempertaure of the merging process stream and chlorine at a first fixed point in the zone just prior to any substantial degree of chemical reaction, then measuring the temperature at a second fixed point downstream of the first point.

3. An apparatus for quantitatively determining the presence of a chemical compound contained within a mixture of chemical compounds comprising an open end metal tubular portion upon an outer surface of each end of which is affixed, in direct and intimate contact therewhich leads composed of a metal dissimilar to that of which the tubular portion is composed, said leads being operatively engaged to an indicating device for converting an electrical impulse into an intelligible signal and having a gas entry port located on said tubular portion between said leads.

4. An apparatus for quantitatively determining the presence of an unsaturated hydrocarbon compound contained within a mixture of chemical compounds inert to chlorine under reacting conditions, comprising an open end tubular ferrous metal portion within which is contained iron wool, and upon an outer surface of each end of which is affixed, in direct and intimate contact therewith, leads composed of a metal dissimilar to that of which the tubular portion is composed, said leads being operatively engaged to an indicating device for converting an electrical impulse into an intelligible signal and having a gas entry port located on the tubular ferrous metal portion at a point between said leads.

5. A method for quantitatively determining the presence of an unsaturated hydrocarbon compound contained within a mixture of chemical compounds inert to chlorine under reacting conditions, comprising withdrawing a portion of said mixture and passing it through a measurement zone into which hydrogen chloride is concurrently added, mixing chlorine with said portion in the zone, said chlorine being mixed therewith in at least stoichiometric quantities with the unsaturated hydrocarbon compound contained within the mixture, measuring the temperature of the merging portion and reagent at a fixed point in the zone just prior to any substantial degree of chemical reaction, then measuring the temperature at a second fixed point downstream of the first point and comparing the difference between the aforesaid temperatures with the differential temperatures obtained by chemically reacting chlorine with mixtures containing an unsaturated hydrocarbon compound in known compositions.

6. The method of claim 5 wherein iron wool is placed within the measurement zone.

7. A method for quantitatively determining the presence of ethylene within a mixture of chemical compounds comprising withdrawing a portion of said mixture and passing it through a measurement zone, mixing in the zone into which hydrogen chloride is concurrently added chlorine with said portion at at least stoichiometric proportions with the ethylene contained within the mixture, measuring the temperature of the merging process stream and chlorine at a first fixed point in the zone just prior to any substantial degree of chemical reaction, then measuring the temperature at a second fixed point downstream of the first point and comparing the difference between the aforesaid temperatures with the differential temperatures obtained by chemically reacting chlorine with mixtures containing ethylene in known compositions.

8. The method of claim 7 wherein iron wool is placed within the measurement zone.

References Cited in the file of this patent
UNITED STATES PATENTS

| | | |
|---|---|---|
| 1,333,850 | Kennedy | Mar. 16, 1920 |
| 1,559,461 | Ruben | Oct. 27, 1925 |
| 1,627,204 | Ruben | May 3, 1927 |
| 1,681,047 | Porter | Aug. 14, 1928 |
| 1,779,569 | Thompson | Oct. 28, 1930 |
| 2,446,283 | Hulsberg | Aug. 3, 1948 |
| 2,909,413 | Hildyard | Oct. 20, 1959 |
| 2,974,017 | Morgan | Mar. 7, 1961 |

FOREIGN PATENTS

| | | |
|---|---|---|
| 402,011 | Great Britain | Nov. 23, 1933 |
| 491,154 | Great Britain | Aug. 26, 1938 |